(No Model.) 3 Sheets—Sheet 1.
F. G. WHEELER.
SYSTEM OF STREET CAR PROPULSION.
No. 453,525. Patented June 2, 1891.
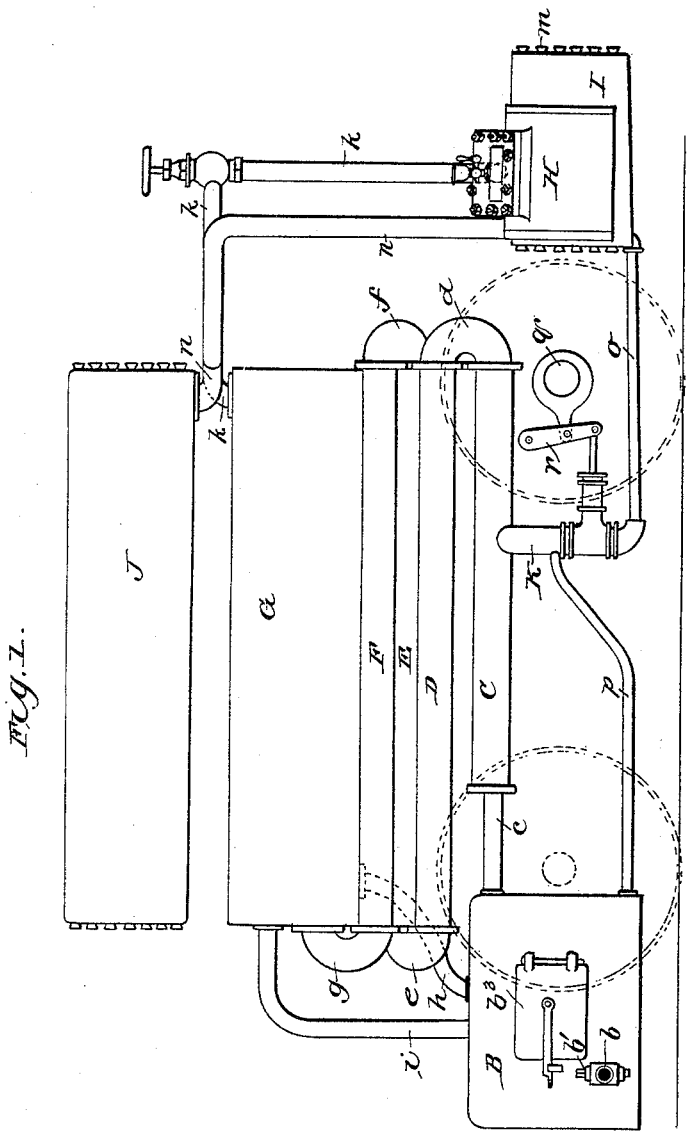
WITNESSES:
Fred G. Dieterich
Chas. R. Wright
INVENTOR:
Frederick G. Wheeler.
BY Munn
ATTORNEYS

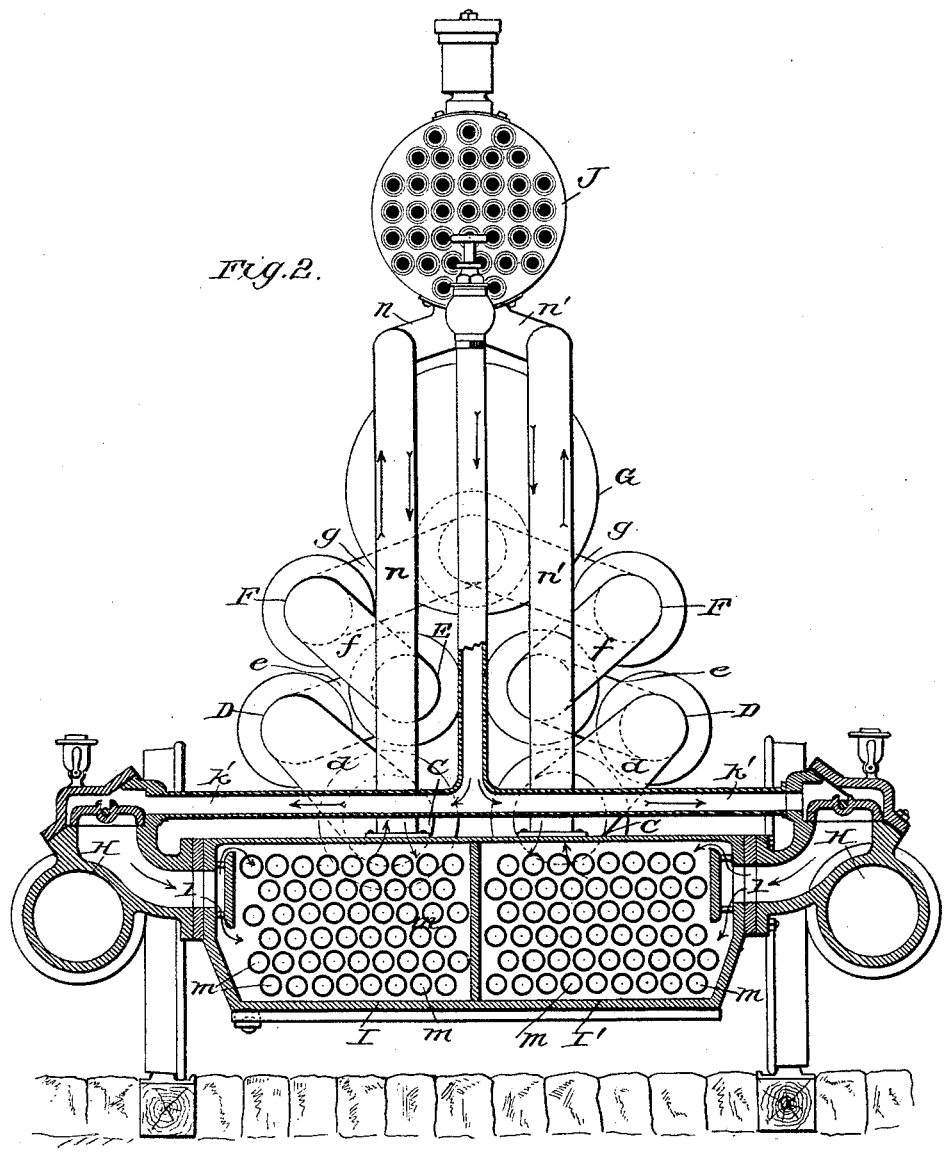

(No Model.) 3 Sheets—Sheet 3.
F. G. WHEELER.
SYSTEM OF STREET CAR PROPULSION.
No. 453,525. Patented June 2, 1891.
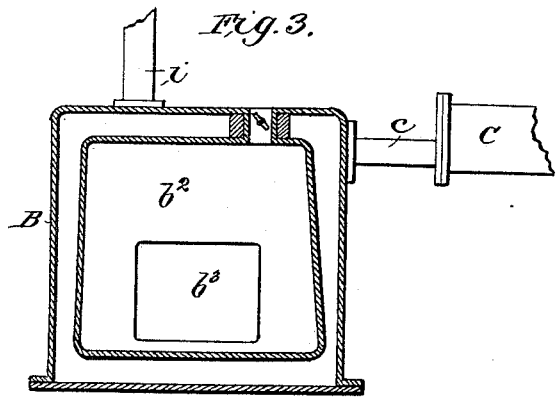
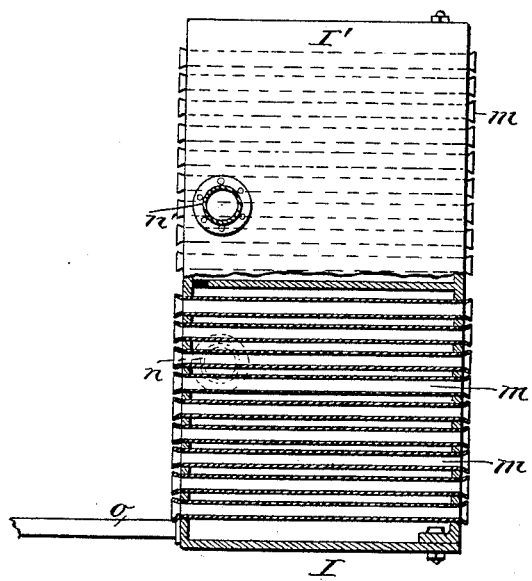
WITNESSES:
Fred G. Dieterich
Chas. R. Wright
INVENTOR:
Frederick G. Wheeler.
BY
ATTORNEYS

UNITED STATES PATENT OFFICE.

FREDERICK G. WHEELER, OF NEW YORK, N. Y.

SYSTEM OF STREET-CAR PROPULSION.

SPECIFICATION forming part of Letters Patent No. 453,525, dated June 2, 1891.

Application filed December 17, 1889. Serial No. 334,031. (No model.)

*To all whom it may concern:*

Be it known that I, FREDERICK G. WHEELER, a citizen of the United States, residing at New York, in the State of New York, have invented a new and useful Improvement in the System of Street-Car Propulsion; and I do hereby declare that the following is a full, clear, and exact description thereof.

My invention relates to improvements in that class of street-car motors in which the water is raised to the requisite heat in a stationary boiler and supplied to a water-chamber on the motor-car, and is an improvement on the system described in the Patent No. 299,607, granted to me June 3, 1884.

The invention consists in the particular construction and arrangement of parts, as hereinafter fully described, and pointed out in the claims.

Reference is to be had to the accompanying drawings, in which similar letters of reference indicate corresponding parts in all the figures.

Figure 1 is a side elevation of my improvement. Fig. 2 is an end view, partly in section. Fig. 3 is a sectional elevation of the water-chamber and fire-box; and Fig. 4 is a plan view, partly in section, of the lower condenser.

In the drawings, Fig. 1 represents a motor-car, the actuating mechanism of which may be of any suitable construction. To and beneath the lower rear part of the car is secured the water-chamber B. This water-chamber forms a part of and directly communicates with the principal hot-water and steam reservoir of the car, which is to be charged through the intervening water-chamber with hot water from a stationary steam boiler or generator through a pipe $b$ entering the side of the water-chamber and having a stop-cock $b'$. The water-chamber surrounds the fire-box, and is preferably formed of an inner and outer shell, the inner shell forming an inner heating-chamber or fire-box $b^2$, and the space between the shells forming the water-chamber. The shells of the chamber are provided with doors $b^3$ to permit of charging the chamber from time to time, as required, during the travel of the car, with hot blocks of iron or other suitable or non-inflammable substance capable of receiving and maintaining a high degree of heat, and which will serve to maintain the temperature of the previously-charged hot water. From the hot-water chamber B lead pipes $c$, which connect the water-chamber with the lower pipes or tubes C of the series of circulating pipes or tube C, D, E, and F, which are connected by the couplings $d$, $e$, and $f$. Above the series of pipes or tubes is arranged the dome G, which forms a part of the circulating system, and with which the upper pipes F are connected by the coupling $g$. From the lower side of the dome G lead pipes $h$, which extend to and connect the said dome with the water-chamber. By means of the pipes $c$ and $h$ the water-chamber is connected to each end of the tube system through the dome, thus affording a complete circulation of the water. To accelerate the circulation of water, the water-chamber is also connected to the dome G by means of pipe $i$, which, passing from the top of the water-chamber, as shown, direct any accumulation of steam in the water-chamber to the current of circulation in the dome G. From the top of the dome G leads a pipe $k$, which is connected to the pipes $k'$, leading to the cylinders H, and through which steam is supplied to said cylinders.

Under the front part of the car are mounted two condensers I I', one for each cylinder, and into which the exhaust-steam from the adjoining engine-cylinder passes through the passages $l$. The condensers I are preferably mounted on the car, so as to be in about the same horizontal plane or below the engine-cylinders, as clearly shown in the drawings. The condensers consist of boxes or casings having inclined bottoms and provided with a series of longitudinal tubes $m$, extending through them, the said tubes having both ends open and being preferably of copper or some highly-sensitive metal, the outer ends of which are formed in a bell or funnel shape, so that upon the movement of the car the outer area of the flaring ends of the tubes, upon which the air will impinge, will largely exceed that of the tube itself and will concentrate all the air striking the outer surface of the exhaust-chamber into the tubes. The condensers are in communication with each other at their rear lower ends, and are so arranged that the tubes will be in the direction of line of movement of the car, so that as the car moves in either direction the air will be drawn through the tubes by suction and the exhaust-steam rapidly condensed. To facilitate the condensation of the steam I arrange above the system of circulating-pipes an auxiliary condenser J, constructed in a similar manner to the condensers I I' and connected thereto by branch pipes n and n', so that any portion of the exhaust-steam in the condensers I remaining uncondensed will rise to the upper condenser J and there be condensed and returned to the condensers I I'.

In order that the water of condensation in the condenser I I' may be returned to the water-chamber B and thereby produce a complete circulating system, I mount a pump K on the car and connect it with the condenser I by the pipe o and with the water-chamber B by the pipe p. The pump K is operated by an eccentric q on one of the axles of the car connected to a lever r, which in turn is connected to the pump.

The operation is as follows: Hot water having been supplied to the water-chamber B and a very high temperature being maintained by means of hot bars of iron or other suitable or non-inflammable substance, the water will be caused to pass through the various pipes and then back again to the water-chamber, a continuous circulation of heated water being thus maintained. The steam generated will accumulate in the dome G, and will pass through the pipes k k' to the cylinders H. The exhaust-steam from the cylinders will pass into the condensers I I' J, there condensed, and the water of condensation conducted from the lowest point in condenser I I' back to the water-chamber by the pump K.

From the above-described construction and arrangement of parts I cause the water to circulate through the series of tubes back to the water-chamber and also cause the water of condensation from the exhaust-steam to be led back to the said water-chamber, thereby producing a complete circulating system.

Although I have shown two condensers I I', one for each cylinder, yet one could be made to serve for both cylinders, and the upper condenser J could be dispensed with or two upper condensers could be used, if desired; but I prefer to use the three condensers, as shown.

Having thus described my invention, what I claim as new, and desire to secure by Letters Patent, is—

1. The combination, with an engine-cylinder, of a circulating system connected with said cylinder and comprising a water-chamber, a series of tubes, a condenser, and means interposed between the condenser and hot-water chamber for conducting the water of condensation back to the said chamber, substantially as described.

2. In a system of street-car propulsion, the combination, with the engine-cylinders, of a water-chamber, a system of circulating-pipes connected with the cylinders and water-chamber, condensers arranged in the front lower part of the engine and connected with the exhaust-ports of the cylinders, an auxiliary condenser arranged above the level of the first-named condensers and connected with the same, and a pump connected with the lower condensers and the water-chamber, substantially as described.

3. In a system of street-car propulsion, the combination, with the engine-cylinder, of the water-chamber surrounding an inner heating-chamber, a system of pipes connecting the water-box and cylinders, the condensers I I' J, connected together, and the condensers I I', connected to the exhaust-ports of the engine-cylinders, the pump K, connected to the condensers I I' and water-chamber B, and means for operating the pump from the axle of the motor, substantially as described.

FREDERICK G. WHEELER.

Witnesses:
EDGAR TATE,
E. M. CLARK.